United States Patent [19]

Patterson et al.

[11] 3,791,466
[45] Feb. 12, 1974

[54] LOW PARASITIC CAPTURE FUEL ASSEMBLY STRUCTURE

[75] Inventors: John F. Patterson, Murrysville; Elmer A. Bassler, Jr.; Edward J. Choby, both of Irwin, all of Pa.

[73] Assignee: Westinghouse Electric Corporation, Pittsburgh, Pa.

[22] Filed: Mar. 21, 1972

[21] Appl. No.: 236,780

Related U.S. Application Data

[63] Continuation of Ser. No. 825,889, May 19, 1969.

[52] U.S. Cl....... 176/78, 176/73, 176/76, 176/81, 176/83
[51] Int. Cl............. G21c 3/34, G21c 3/30
[58] Field of Search ............ 176/73, 76, 78, 81, 83

[56] References Cited
UNITED STATES PATENTS

| 3,442,763 | 5/1969 | Chetter et al. | 176/78 |
| 3,393,128 | 7/1968 | Obertelli et al. | 176/78 |
| 3,481,832 | 12/1969 | Rickert | 176/78 X |
| 3,205,144 | 9/1965 | Jabsen | 176/50 |
| 3,368,945 | 2/1968 | Keller et al. | 176/78 X |
| 3,510,398 | 5/1970 | Wood | 176/78 |
| 3,680,201 | 8/1972 | McGregor | 176/81 X |
| 3,390,053 | 6/1968 | Tarasuk et al. | 176/81 X |
| 3,308,034 | 3/1967 | Schmidt | 176/81 |
| 3,049,485 | 8/1962 | Tatlock et al. | 176/83 |

FOREIGN PATENTS OR APPLICATIONS

| 1,142,051 | 2/1965 | France | 176/76 |
| 1,204,657 | 9/1970 | Great Britain | 176/78 |

*Primary Examiner*—Carl D. Quarforth
*Assistant Examiner*—Roger S. Gaither
*Attorney, Agent, or Firm*—A. T. Stratton

[57] ABSTRACT

The basic fuel assembly structure for a nuclear reactor comprises a skeleton made up of individual hollow tubes composed of a zirconium base alloy, such as Zircaloy, and held in place by Inconel or stainless steel grids disposed between stainless steel end nozzles at the top and the bottom of the structure. The tubes serve as guide thimbles for cylindrical control elements strategically located in a square array of fuel rods held in place by spring fingers on the "egg-crate" grids. The guide thimbles are attached to the top and bottom nozzles and the grids by mechanical joints without welding dissimilar metals.

17 Claims, 13 Drawing Figures

LOW PARASITIC CAPTURE FUEL ASSEMBLY STRUCTURE

This is a continuation, of application Ser. No. 825,889 filed May 19, 1969.

BACKGROUND OF THE INVENTION

This invention relates, generally, to fuel assemblies for nuclear reactors and, more particularly, to a fuel assembly having a relatively small amount of parasitic structural material therein.

In the past, welding has been utilized to attach stainless steel hollow tubes to the grids and end nozzles of a canless fuel assembly comprising a square array of fuel rods and the strategically located hollow tubes which serve as guide thimbles for cylindrical control elements. The fuel rods are held in place by spring fingers on the grids spaced between the end nozzles. With the use of a zirconium base alloy, such as Zircaloy, as a guide thimble in order to still further reduce the quantity of high neutron capture material in a fuel assembly, normal welding or brazing techniques cannot be utilized because a brittle alloy is formed at the interface between the dissimilar metals.

In order to make the basic fuel assembly structure, which comprises a skeleton made up of individual Zircaloy guide thimbles held by Inconel or stainless steel grids within stainless steel nozzles at top and bottom, a means must be provided to firmly attach the guide thimbles to the support grids and the end nozzles without welding or brazing two dissimilar metals. Furthermore, since Zircaloy becomes significantly brittle as a result of irradiation and hydrogen pickup during operation of a reactor, it is desirable to strengthen the critical joints between the guide thimbles and end nozzles with a more ductile material, such as stainless steel.

An object of the invention is to provide a mechanical joint between the guide thimbles and the support grids of a reactor fuel assembly structure which results in minimum pertubation to coolant flowing through the fuel assembly; allows the use of a thimble tube having the largest possible diameter; does not have loose contacts or connections; is not subject to severe corrosive attack, and has adequate structural strength.

Another object of the invention is to provide a joint between the thimble tubes and end nozzles which, in addition to the foregoing characteristics, does not severely restrict coolant flow, and has adequate ductility to resist impact forces during fuel loading and unloading operations and abnormal reactor operating conditions.

Other objects of the invention will be explained hereinafter or will be apparent to those skilled in the art.

SUMMARY OF THE INVENTION

In accordance with one embodiment of the invention, the quantity of high neutron capture material in a canless fuel assembly for a nuclear reactor is reduced by utilizing hollow tubes composed of a relatively low neutron capture material, such as a zirconium base alloy, to serve as guide thimbles for cylindrical control elements strategically located in a square array of fuel rods held in place by spring fingers on Inconel or stainless steel "egg-crate" grids disposed between stainless steel end nozzles at the top and the bottom of the fuel assembly structure. The guide thimbles are firmly attached to the end nozzles and the support grids by mechanical joints without welding or brazing two dissimilar metals. The tubes or thimbles are retained in stainless steel sleeves by integrated protrusions on the tubes, and the sleeves are brazed to Inconel or stainless steel grids to provide the main structural skeleton of the basic fuel assembly. The skeleton is attached to the stainless steel end nozzles through stainless steel sleeves in a manner to permit longitudinal expansion, thereby reducing the loading on the fuel assembly caused by differential thermal expansion between components. Also, the joints between the guide thimbles and the end nozzles are strengthened since the sleeves do not become as brittle as a result of irradiation during operation of the reactor.

BRIEF DESCRIPTION OF THE DRAWINGS

For a better understanding of the nature and objects of the invention, reference may be had to the following detailed description taken in conjunction with the accompanying drawings, in which.

DESCRIPTION OF THE PREFERRED EMBODIMENTS

Figure 1:
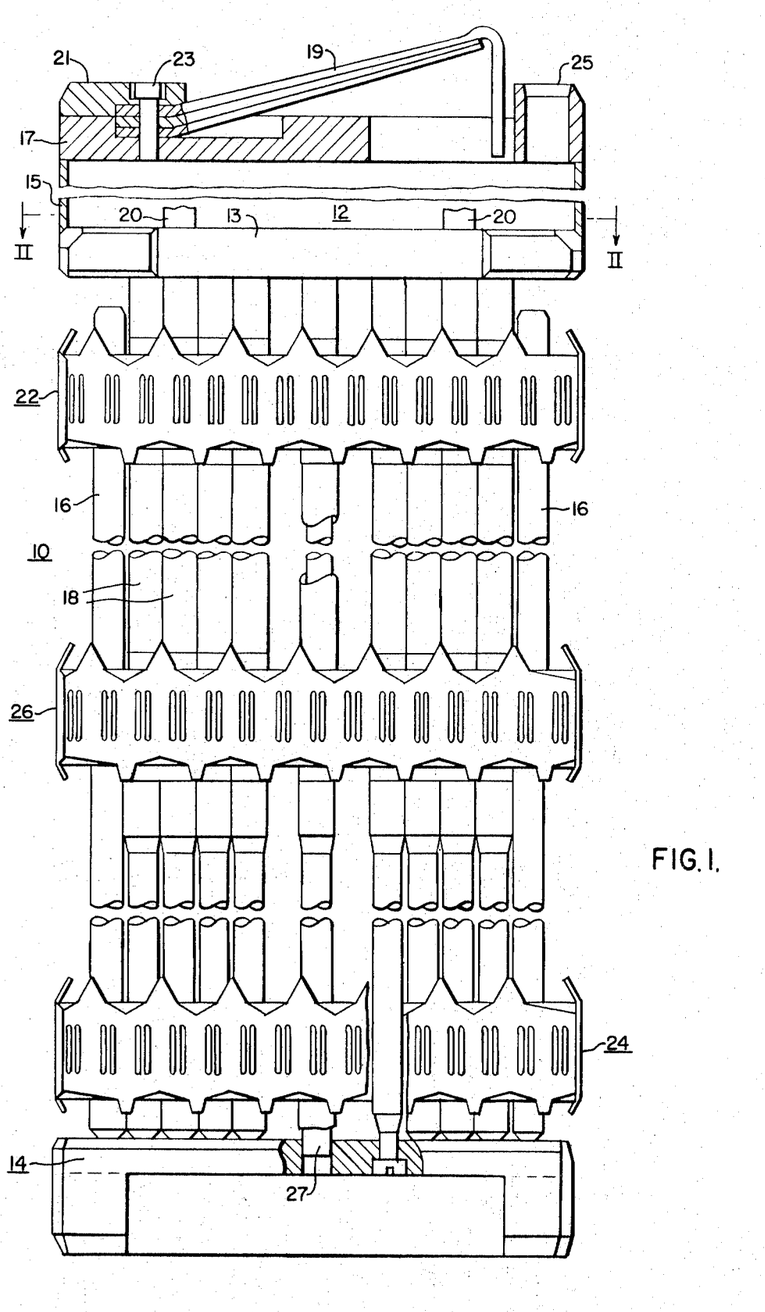
FIG. 1 is a view, in elevation, of a nuclear reactor fuel assembly embodying principal features of the invention, portions being broken away for clearness.
Figure 2:
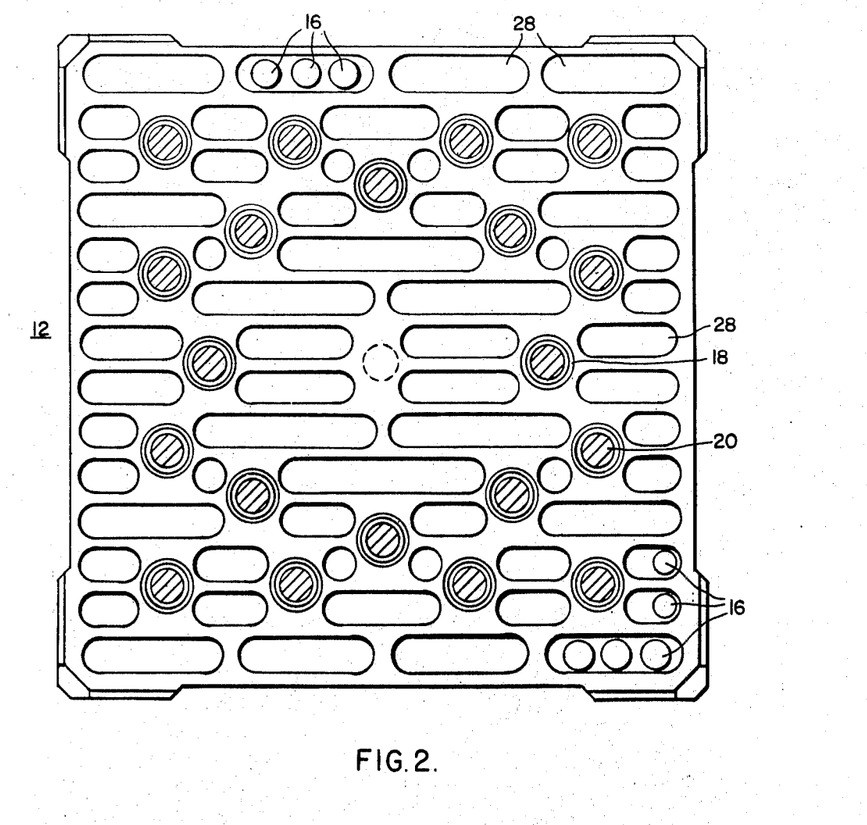
FIG. 2 is a view, in section, taken along the line II—II in FIG. 1.

Referring to the drawings, particularly to FIGS. 1 and 2, a fuel assembly 10 shown therein comprises an upper end structure or nozzle 12, a lower end structure or nozzle 14, a generally square array of substantially parallel elongated fuel elements or rods 16, only a few of which are shown to avoid confusion, a plurality of elongated hollow tubular members 18 containing control elements 20 strategically located among the array of fuel elements 16, a top grid member 22, a bottom grid member 24, and a plurality of intermediate grid members 26 longitudinally spaced along the tubular members 18. An instrumentation tube 27 is located at the center of the fuel assembly. The fuel assembly 10 is of the canless type, such as described in a copending continuation application, Ser. No. 304,292, filed Nov. 6, 1972 by R. J. Creagen and E. Frisch and assigned to the Westinghouse Electric Corporation.

As shown more clearly in FIG. 2, the upper end nozzle 12 is generally square in shape. The nozzle 12 comprises an end plate 13, an enclosure 15 secured to the plate 13 and a flange 17 secured to the top of the enclosure 15. Leaf springs 19 are clamped to the flange 17 by corner blocks 21 and bolts 23. The springs cooperate with a core plate (not shown) to permit expansion of the fuel assembly, but prevent the assembly from being moved upwardly by hydraulic forces. Dowel pins (not shown) extend into diagonally disposed openings 25 in the flange 17 to provide lateral support for the fuel assembly. The plate 13 has a plurality of openings 28 therein to permit the circulation of the reactor coolant through the end nozzle. Likewise, the lower end nozzle 14 is generally square in shape and has a plurality of openings therein to permit the circulation of the reactor coolant. The upper ends of the tubular members 18 are disposed in openings in the upper end nozzle 12 as will be described more fully hereinafter.

Figures 3, 4, 5, 6:
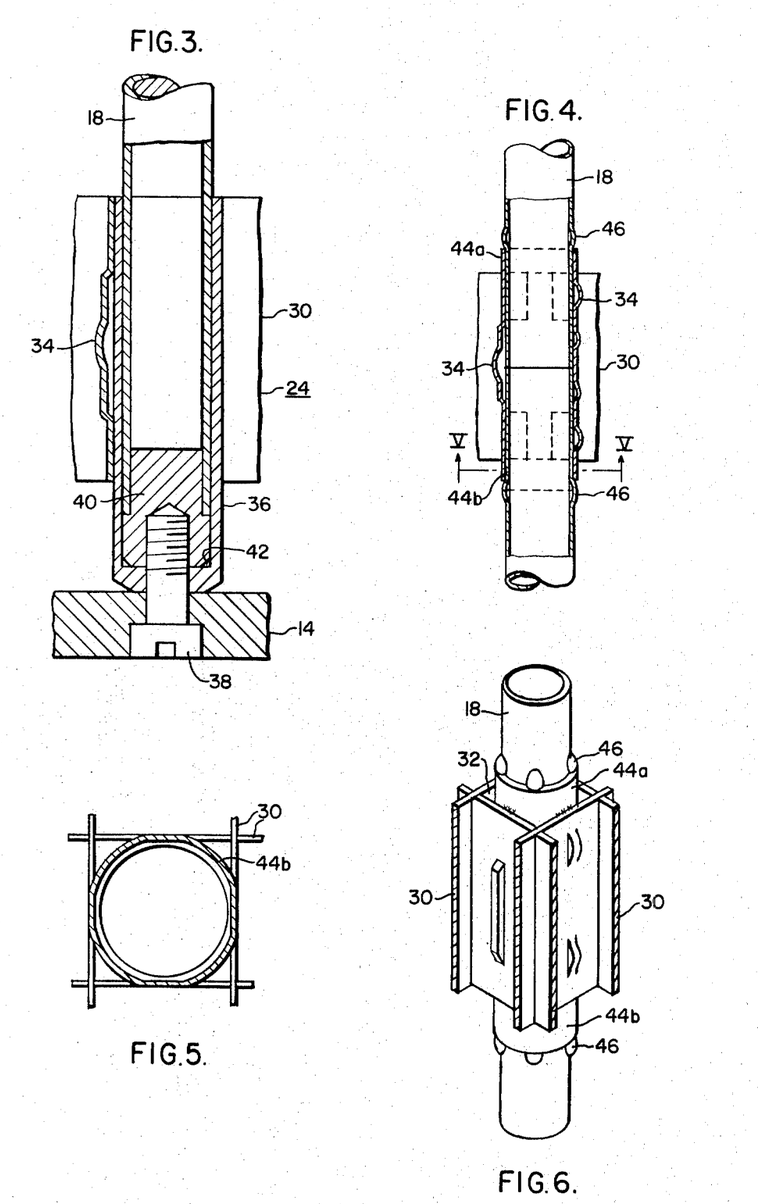
FIGS. 3 and 4 are enlarged detail views, in section of portions of the structure shown in FIG. 1.
FIG. 5 is a view in section, taken along the line V—V in FIG. 4.
FIG. 6 is an isometric view of a portion of one of the grid members and one of the tubular members utilized in the fuel assembly.

As shown more clearly in FIG. 6, each one of the grid structures comprises a plurality of straps 30 which are interfitted to provide a structural network similar to an "egg-crate" and forming a plurality of generally square openings or cells 32 through which the fuel rods 16 and the tubular members 18 pass. As shown in FIGS. 3 and 4, the straps 30 are provided with resilient fingers 34 which engage the fuel rods 16 and the tubular members 18 to support them against lateral displacement.

As explained hereinbefore, the hollow tubes 18 serve as guide thimbles for the cylindrical control elements 20. In order to reduce the quantity of high neutron capture material in the fuel assembly, the tubes 18 are composed of a relatively low neutron capture material, such as a zirconium base alloy known as Zircaloy. The basic fuel assembly structure consists of a skeleton made up of individual Zircaloy guide thimbles held by Inconel or stainless steel grids with stainless steel nozzles at the top and the bottom of the structure. In order to make such a structure, a means must be provided to firmly attach the Zircaloy guide thimbles to the Inconel or stainless steel support grids and the stainless steel end nozzles. In the past, welding has been used to attach stainless steel guide thimbles to the grids and end nozzles. With the use of Zircaloy as a guide thimble material, normal metallurgical bonding techniques, such as welding or brazing, are not suitable because a brittle alloy is formed at the interface between the dissimilar metals. Furthermore, since Zircaloy becomes significantly brittle as a result of irradiation and hydrogen pick up during operation of a reactor, it is desirable to strengthen the critical joint between the guide thimbles and end nozzles with a more ductile material, such as stainless steel.

In accordance with the present invention, individual fuel rods are loaded into the spring clip grid structures and the end nozzles are attached. The individual Zircaloy guide thimbles are attached to the top and bottom end nozzles and the support grids by mechanical joints, thereby avoiding the welding or brazing of two dissimilar metals in the fuel assembly structure.

As shown in FIGS. 1 and 3, the lower end nozzle 14 is attached to the bottom grid member 24 and to the tubular members 18 by means of stainless steel sleeves 36 and machine screws 38. A sleeve 36 surrounds each tubular member 18 at the opening 32 in the grid structure through which the tube 18 extends. A metal plug 40 is pressed and welded into the lower end of each tube 18.

The sleeve 36 has an internal shoulder 42 which engages the lower end of the plug 40. The sleeve 36 is brazed to the grid 24 which is composed of Inconel or stainless steel. When the screw 38 is threaded into the plug 40 with the head of the screw engaging the end nozzle 14, the lower end of the sleeve 36 is retained between plug 40 in the lower end of the tube 18 and the end nozzle 14. Tight clearances between the head of the screw 38, the hole in the lower nozzle 14, and the hole in the bottom of the grid sleeve 36 locate the bottom of the thimble accurately. Proper selection of joint dimensions and initial screw tension insures a tight joint over a wide temperature range without danger of the material yielding as a result of differential thermal expansion between Zircaloy and stainless steel.

The joint structure makes it possible to connect the main structural skeleton to the lower end nozzle through the stainless steel sleeve which is brazed to the bottom grid 24. Such a connection could be subjected to high impact loading during fuel assembly handling procedures. Stainless steel is less susceptible to becoming brittle under reactor operating conditions than Zircaloy. Therefore, the fuel assembly is less likely to be damaged during dynamic loading or handling than is the case with other connections.

As shown in FIGS. 4, 5 and 6, each intermediate grid support 26 is retained in position by means of two stainless steel sleeves 44a and 44b surrounding each one of the tubular members 18 in the opening 32 in the grid structure. The sleeves 44a and 44b are brazed to the grid straps 30. The tubular member 18 is expanded to form protrusions 46 integral with the tube immediately above and below the grid sleeve. Thus, the protrusions 46 engage the stainless steel sleeves which, in turn, are brazed to the grid, thereby retaining the grid in position. As shown in FIG. 5, the stainless steel sleeves have an inside diameter approximately equal to the distance between the individual grid straps making up the grid. Four slots in each sleeve at 90° intervals make it possible to insert the sleeve into an individual grid cell as the grid is assembled for brazing. Two sleeves, 44a and 44b are provided for each grid cell. The sleeve structure permits the use of maximum diameter guide thimbles.

The tool which is utilized to expand the tube 18 is so constructed that flats are obtained on 90° angles of the expanded protrusion as shown in FIG. 5. The flats reduce coolant flow pertubations near the fuel rods whose center line is directly opposite the flats. The maximum extension of the protrusions at the four corners of the grid cells block coolant flow at this point. This blockage has a favorable affect upon flow distribution within the fuel assemblies.

Figure 7:
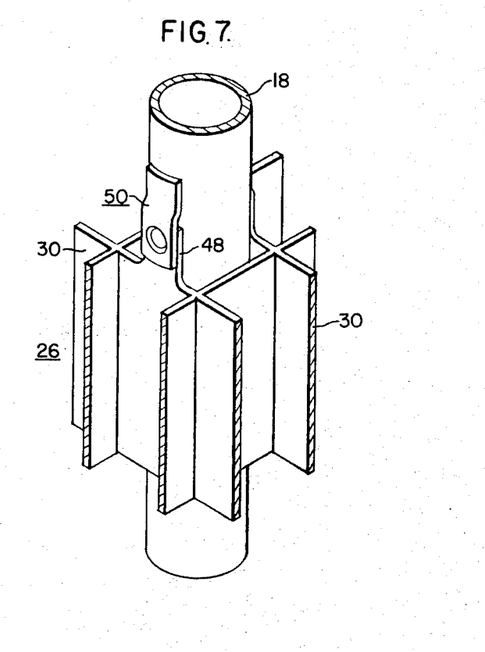
FIG. 7 is an isometric view, similar to FIG. 6, showing a modified grid and tube assembly.
Figure 8:
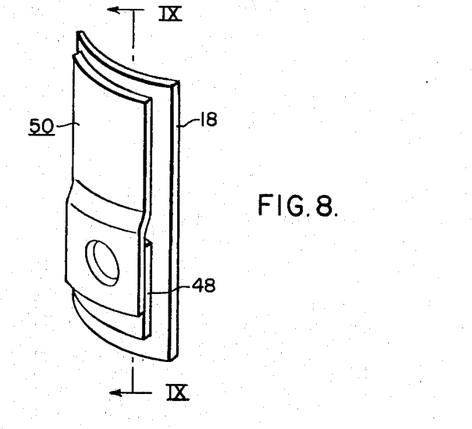
FIG. 8 is an enlarged detail view of a portion of the assembly shown in FIG. 7.
Figure 9:
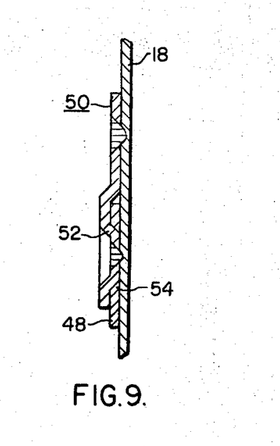
FIG. 9 is a view, in section, taken along the line IX—IX in FIG. 8.

An alternate method for attaching the grid members to the tubular members is shown in FIGS. 7, 8 and 9. A tab extension 48 on a grid strap 30 is captured by a spot weld between the Zircaloy tube 18 and a Zircaloy clip 50. The clip is stamped to provide a base 52 which fits through a hole 54 punched in the grid strap tab 48. The fit between the base and the hole is such that the clip is securely clamped to the thimble tube by the tapered sides on the base when the base is spot welded to the thimble tube. The clip 50 is also spot welded to the tube 18 above the grid tab to secure the clip in the event the lower weld is sheared. In this structure the spot welding is performed on two members which are composed of the same material, namely Zircaloy. As shown, tabs 48 and clips 50 are provided on grid straps at opposite sides of the tube 18.

Figures 10, 11:
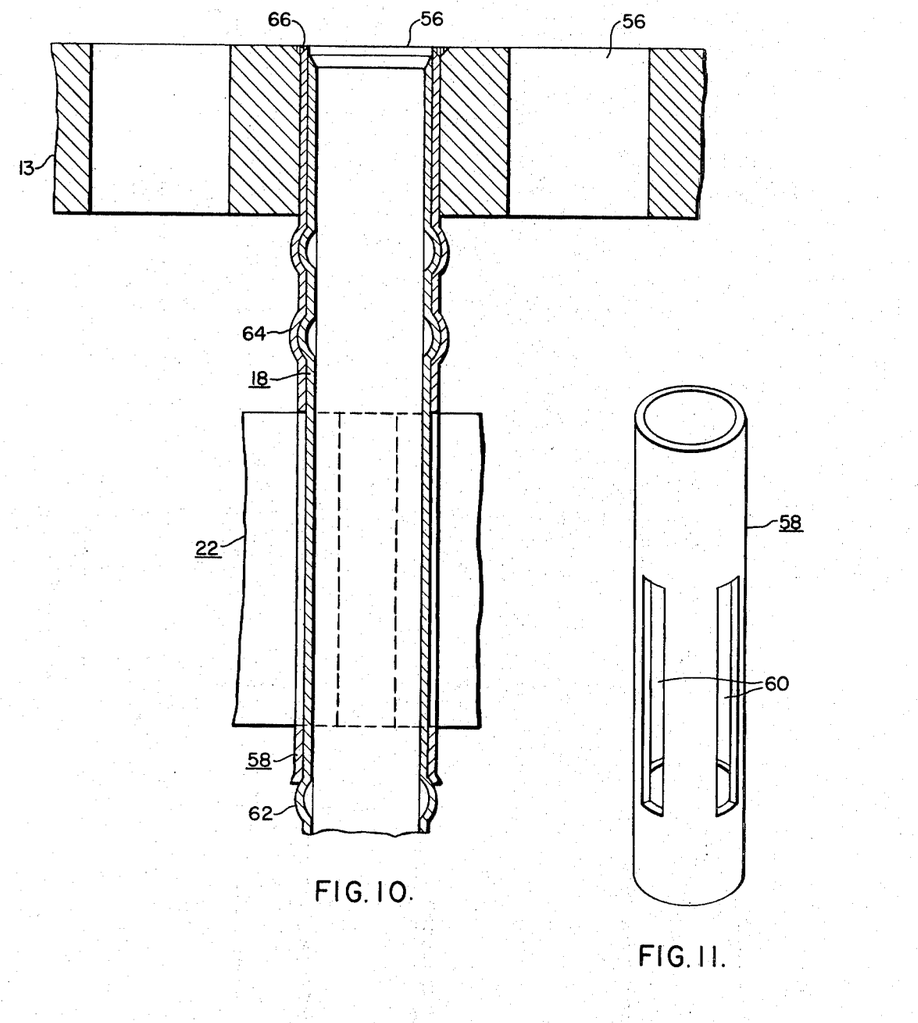
FIG. 10 is an enlarged detail view, in section, showing one of the tubular members assembled in the top nozzle and the top grid of the fuel assembly.
FIG. 11 is an isometric view of one of the retaining sleeves utilized in the fuel assembly.

The upper end nozzle 12 is attached to the upper ends of the tubular members 18 in the manner shown in FIG. 10. The upper end of each tube 18 is disposed in an opening 56 in the end plate 13 of the nozzle 12. A stainless steel sleeve 58 is brazed to the top grid 22. The inside diameter of the sleeve is approximately equal to the distance between the individual straps making up the grid assembly. Four slots 60 located in the sleeve 58 at 90° intervals, as shown in FIG. 11, make it possible to insert the sleeve into a grid cell as the grid is assembled for brazing. During this assembly it is necessary to slightly deform a 90° segment of the lower circular section of the sleeve in order to fit it between the grid straps. The sleeve is subsequently re-straightened before brazing. The sleeve structure makes it possible to use a Zircaloy thimble tube of a maximum diameter. The top grid 22 is mechanically attached to the thimble tube 18 by first expanding the tube at a point just below the lower end of the sleeve 58 to form a protrusion 62 integral with the tube. Finally, both the thimble tube and the sleeve 58 are expanded outwardly at one or more places above the grid to form protrusions 64 integral with the tube and the sleeve. The plate 13 is welded at 66 to the upper end of the sleeve 58.

In this manner the grid 22, the tube 18 and the end nozzle 12 are mechanically connected by means of the stainless steel sleeve 58. Stainless steel sleeves are used to structurally connect the main fuel bundle to the upper nozzle because this material retains more ductility under reactor operating conditions than Zircaloy. As previously explained, a Zircaloy connection could be subject to damage during dynamic loading due to becoming brittle due to irradiation and hydrogen pick up during reactor operation. It will also be noted that the mechanical connection permits longitudinal expansion of the tubes 18 by compressing or tightening the protrusions in the tubes as the reactor reaches operating temperature. If proper dimensions are selected the tubes will be tight during operation of the reactor.

Figure 12:
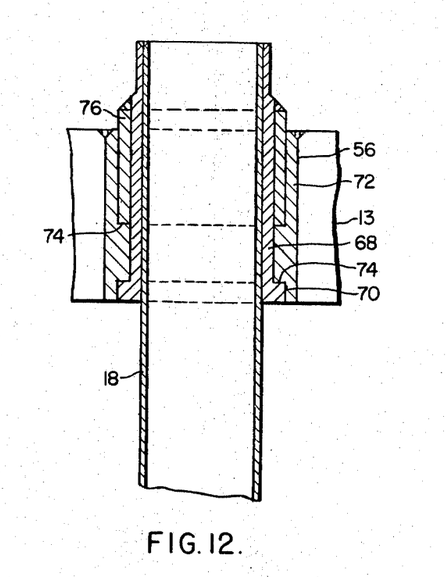
FIG. 12 is a view, in section, of a modified tube and top nozzle assembly.

An alternate method for attaching the upper end nozzle 12 is shown in FIG. 12. An adapter sleeve 68 surrounds each tube 18 in the opening 56 in the plate 13. The lower end of the sleeve 68 has an external flange 70 thereon. A retainer sleeve 72 surround the adapter sleeve. The retainer sleeve 72 has an internal flange 74 engaging the external flange 70 on the adapter sleeve 68. A capture sleeve 76 extends between the adapter sleeve and the retainer sleeve to engage the internal flange 74 on the retainer sleeve. The adapter sleeve and the capture sleeve are composed of Zircaloy, or a metal similar to the metal of the tubular member 18. The retainer sleeve 72 is composed of stainless steel or a metal similar to the metal of the end plate 13. The adapter sleeve 68 is secured to the tubular member 18 by metallurgical bonding or welding, and the capture sleeve 76 is secured to the adapter sleeve by metallurgical bonding or welding. Likewise, the retainer sleeve 72 is secured to the end plate 13 by metallurgical bonding or welding. In all cases the welding is performed between similar metals.

Figure 13:
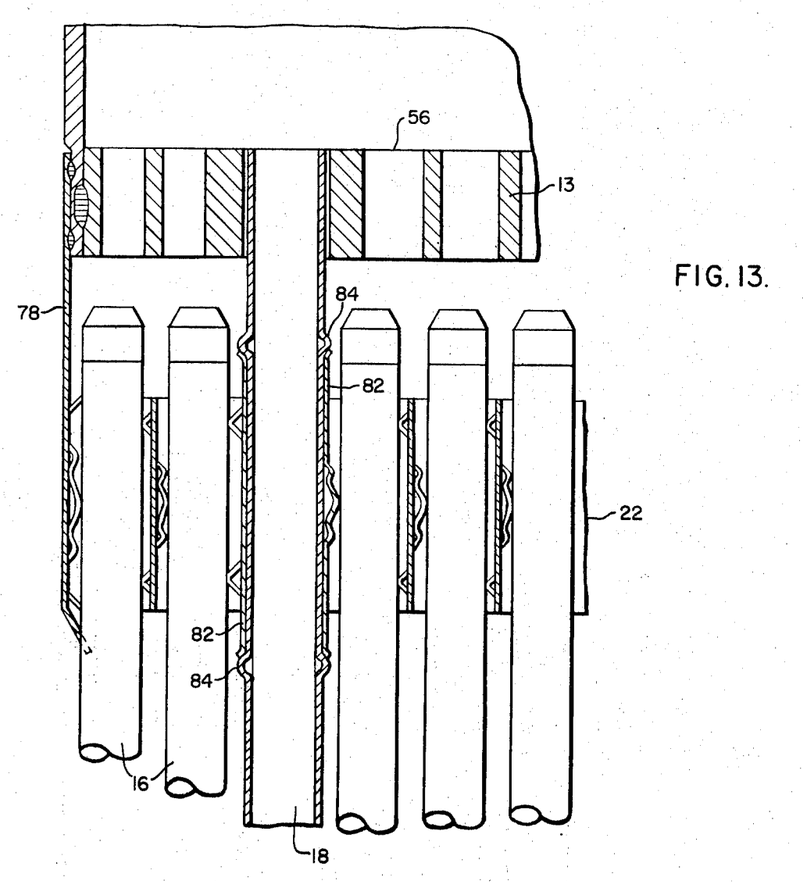
FIG. 13 is a view, in section, of another modification of the grid, tube and nozzle assembly.

Another alternate method of attaching the upper end nozzle 12 is shown in FIG. 13. In this arrangement, the upper end nozzle is attached to the top grid member 22 rather than to the guide thimbles 18. In the structure illustrated, an extension 78 is provided on the top grid member 22. The extension 78 may be formed integrally with the outer straps of the grid structure or it may be a separate member welded to the grid structure. The extension 78 is welded to the end plate 13 or to the top enclosure 15 for the end nozzle which, in turn, is welded to the end plate, thereby attaching the top grid member to the end nozzle in spaced relation. Also, integral tabs or extensions 82 on the grid member 22 engage protrusions 84 on the tube 18 both above and below the grid member. In this manner axial loads imposed on the assembly are transferred between the end nozzle and the guide thimbles through the grid assembly and the swaged joints between the grid and the thimbles. The top end of each tube 18 is mated with a close fitting hole 56 in the end plate 13 which maintains the lateral alignment of the tube, but permits free axial movement of the tube in the event of differential thermal expansion between the tube and the grid and the end nozzle.

As explained hereinbefore, a suitable tool may be provided for expanding the Zircaloy tubes to form the protrusions thereon which cooperate with the grid and sleeve members surrounding the tubes. The tool may be so constructed that all tubes or thimbles in a fuel assembly are expanded at a specific vertical level simultaneously, thereby obtaining a straight skeleton assembly.

From the foregoing description it is apparent that the invention provides a fuel assembly for a nuclear reactor in which the quantity of high neutron capture material is reduced, the loading on the fuel assembly structure which is caused by differential thermal expansion between components is reduced, and the power capability of the fuel assembly is improved. The fuel assembly is so constructed that welding or brazing, or other forms of metallurgical bonding, is not required at joints between dissimilar metals.

Since numerous changes may be made in the above-described structure and different embodiments of the invention may be made without departing from the spirit and scope thereof, it is intended that all subject matter contained in the foregoing description or shown in the accompanying drawings shall be interpreted as illustrative and not in a limiting sense.

We claim:

1. A fuel assembly for a nuclear reactor comprising an array of generally parallel elongated fuel elements, a plurality of elongated hollow tubular members containing control elements strategically located among the array of fuel elements, said tubular members being composed of a relatively low neutron capture metal, means separately attaching the opposite ends of said tubular members to top and bottom end nozzles respectively located at opposite ends thereof;

at least one grid located between said end nozzles and formed by coacting straps which define multiple spaced openings through which the fuel elements and tubular members extend;

a device immovably positioned on each of said tubular members, said device being located between said tubular means and the walls of said straps; and means securing said device to the inner walls of said straps which define the opening through which each tubular member extends, to thereby hold each tubular member in position in the fuel assembly.

2. The fuel assembly defined in claim 1, wherein the device comprises a sleeve surrounding each tubular member.

3. The fuel assembly defined in claim 2, wherein each sleeve is composed of a metal similar to the metal of the grid straps, and the sleeve is secured to the grid straps by metallurgical bonding.

4. The fuel assembly defined in claim 3, wherein the grid straps are disposed at right angles to form generally square openings, and each sleeve has slots therein of a size sufficient to receive the straps during grid assembly to thereby hold the device and tubular member immovably in the grid straps.

5. The fuel assembly defined in claim 2, wherein spring means is secured to the inside surface of and along the length of said straps forming each opening, said spring means being positioned to bear against each tubular member and fuel element in the appropriate openings to prevent their lateral displacement.

6. The fuel assembly defined in claim 1, wherein each tubular member is deformed adjacent at least one end of said device to immovably fix the device on its tubular member.

7. The fuel assembly defined in claim 1, wherein the device is composed of a metal similar to the metal of the tubular members and is secured to the tubular members by metallurgical bonding.

8. The fuel assembly defined in claim 7, wherein the grid straps have recesses therein, and the device extends into said recesses.

9. The fuel assembly defined in claim 1, wherein said device comprises an adapter sleeve surrounding each tubular member extending through the top nozzle, said adapter sleeve having an external flange thereon, a retainer surrounding the adapter sleeve, said retainer having an internal flange engaging the external flange on the adapter sleeve, and a capture sleeve extending between the adapter sleeve and the retainer to engage the internal flange on the retainer.

10. The fuel assembly defined in claim 9, wherein the adapter sleeve and the capture sleeve are composed of a metal similar to the metal of the tubular member and the retainer is composed of a metal similar to the end nozzle, and wherein said adapter sleeve is secured to the tubular member by metallurgical bonding and the capture sleeve secured to the adapter sleeve by metallurgical bonding, and said retainer being secured to the end nozzle by metallurgical bonding.

11. The fuel assembly according to claim 1, wherein a plurality of grids are longitudinally spaced along the length of said tubular members, and the openings therein are in alignment for receiving the fuel elements and tubular members which bridge the space between said end nozzles; and the upper of said grids being located adjacent said top end nozzle and the lower of said grids located adjacent said bottom end nozzle.

12. The fuel assembly defined in claim 11, wherein the means separately attaching the tubular members to the top end nozzle comprises a sleeve on each tubular member metallurgically bonded to said nozzle;

means securing each sleeve to each tubular member; and each sleeve on each tubular member being metallurgically bonded to the grid straps of the upper grid to hold the tubular members in position.

13. The fuel assembly according to claim 12, wherein the means securing the sleeve to said member comprises integrally formed protrusions on said tubular member which coact with the sleeve to prevent its displacement on said member.

14. The fuel assembly defined in claim 11, wherein the means separately attaching the tubular members to the bottom end nozzle comprises a sleeve on the bottom of each tubular member;

a mechanical device connecting each sleeve to the bottom end nozzle; and each sleeve on each tubular means being metallurgically bonded to the grid straps of the lower grid to hold the tubular members in position.

15. The fuel assembly defined in claim 14, wherein said mechanical device includes a plug coacting with the walls of the tubular member and sleeve; and a coupler connecting the plug with the bottom end nozzle.

16. The fuel assembly according to claim 11, wherein extension means interconnects the outer portion of the upper grid with the top nozzle, and wherein the means attaching the tubular members to said top nozzle includes a close fit which permits axial movement of the tubular members therein;

projections on said tubular members immediately abve and below said upper grid, said device on each tubular member being of a length sufficient to have its ends bear against said projections.

17. The fuel assembly according to claim 16, wherein each device includes an outwardly directed portion intermediate its length arranged to contact adjacent tubular members through openings in the grid strap walls.

* * * * *

UNITED STATES PATENT OFFICE
CERTIFICATE OF CORRECTION

Patent No. 3,791,466     Dated February 12, 1974

Inventor(s) John F. Patterson, Elmer A. Bassler, Jr. Edward J. Choby

It is certified that error appears in the above-identified patent and that said Letters Patent are hereby corrected as shown below:

Column 6, line 62, cancel "means" and insert -- member --.
Column 8, line 27, cancel "means" and insert -- member --.

Signed and sealed this 10th day of December 1974.

(SEAL)
Attest:

McCOY M. GIBSON JR.
Attesting Officer

C. MARSHALL DANN
Commissioner of Patents